Sept. 27, 1949.                A. W. BATEMAN                2,483,119
                    MEANS FOR DESENSITIZING DIFFERENTIAL
                              PROTECTIVE SYSTEMS
                           Filed Feb. 9, 1949
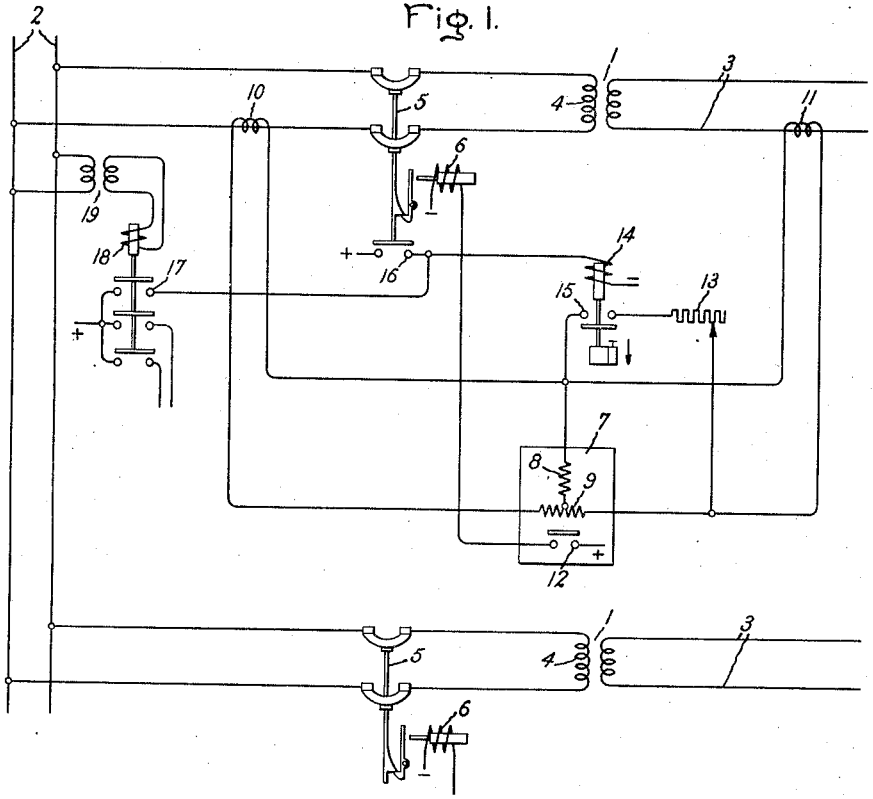
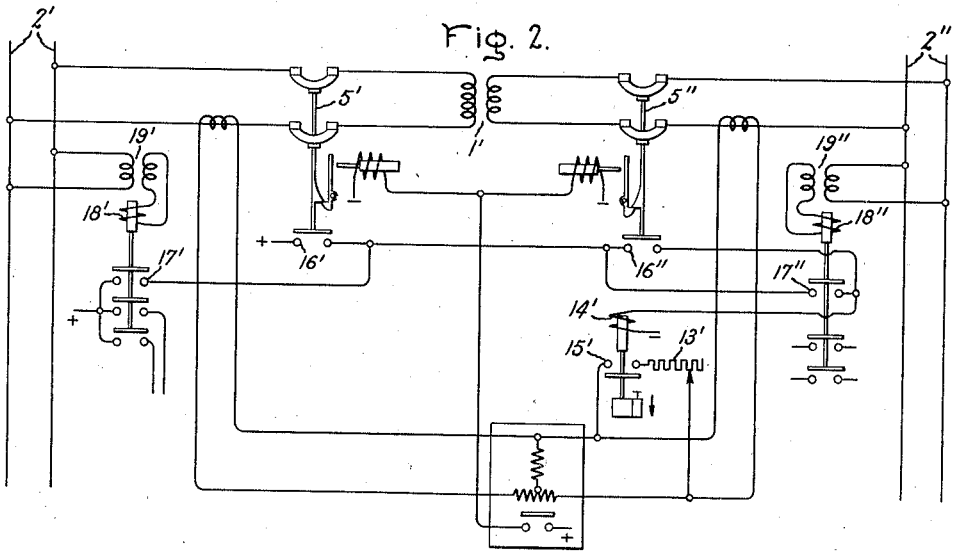
Inventor:
Amos W. Bateman,
by Ernest T. Britton
His Attorney.

Patented Sept. 27, 1949

2,483,119

UNITED STATES PATENT OFFICE 2,483,119

MEANS FOR DESENSITIZING DIFFERENTIAL PROTECTIVE SYSTEMS

Amos W. Bateman, Manoa, Pa., assignor to General Electric Company, a corporation of New York Application February 9, 1949, Serial No. 75,438

6 Claims. (Cl. 175—294)

My invention relates to means for desensitizing differential protective systems which are arranged to protect an electrical apparatus against internal faults therein, and particularly to means for desensitizing a transformer differential protective system so that the protective system does not respond to the differential current produced therein by the magnetizing inrush transient current which flows only in the exciting winding of the transformer when the transformer is initially placed in service or is re-excited by the restoration of voltage across a supply circuit to which the transformer is connected.

Various arrangements have been employed heretofore for desensitizing a transformer differential protective system so that, while the magnetizing inrush transient current is flowing in the exciting winding, a much larger differential current has to flow in the protective system to effect the operation thereof than is necessary after the transformer has been energized long enough for the magnetizing inrush transient current to subside. In Traver Patent 1,787,181, granted December 30, 1930, and assigned to the assignee of this application, means are provided for temporarily completing a desensitizing shunt circuit around the operating winding of the protective relay of a transformer differential protective system in response to the connection of the transformer to an energized supply circuit so that, as long as the desensitizing circuit is completed, the operating winding of the protective relay is energized by a smaller portion of the total differential current flowing in the protective system than flows through the operating winding when the desensitizing circuit is open. While the desensitizing arrangement disclosed in the aforesaid Traver patent has been used quite extensively in practice it has the undesirable feature of requiring, for each protected power transformer, a separate potential transformer, which potential transformer is not required for other purposes and which materially increases the cost of the desensitizing arrangement.

One object of my invention is to provide an improved desensitizing arrangement for a differential protective system which does not require a separate potential transformer for each protected power transformer, but instead employs a single potential transformer for each supply circuit irrespective of the number of differentially protected power transformers that may be supplied therefrom.

Since potential transformers are usually connected to a supply circuit for other purposes such as indicating, metering, etc., it will be seen that my improved desensitizing arrangement does not require any transformers in addition to those that are usually already available for other purposes.

My invention will be better understood from the following description when taken in connection with the accompanying drawing, and the scope of my invention will be pointed out in the appended claims.

In the accompanying drawing, Fig. 1 illustrates an embodiment of my invention in connection with the differential protective systems for a plurality of power transformers energized from a common supply circuit and supplying current to a separate load circuit, and Fig. 2 illustrates another embodiment of my invention in connection with a differential protective system for one of a plurality of power transformers interconnecting two electric circuits or systems from either of which the transformer may be energized.

In the embodiment of my invention shown in Fig. 1, a plurality of single phase transformers 1 are arranged to be supplied with current from a common single phase supply circuit 2 and are arranged to supply current to different single phase circuits 3. The primary or input winding 4 of each transformer 1 is connected to the supply circuit 2 by a separate circuit interrupter 5 of any suitable type. As shown, each circuit interrupter 5 is arranged to be closed manually and to be opened by the energization of an associated trip coil 6.

In order to protect each transformer 1 from damage due to internal faults therein, each transformer is provided with a differential protective system of any well-known type, examples of which are well known in the art, which functions to effect the opening of the associated circuit interrupter 5 when a predetermined unbalance occurs between the currents flowing in the primary and secondary circuits of the transformer. For the purpose of simplifying the drawing, the differential protective arrangement for only one of the transformers 1 is shown since all of the protective systems may be duplicates of each other. As shown, each protective system includes a protective relay 7 having an operating winding 8 and a restraining winding 9, which in a manner well known in the art is so connected by the current transformers 10 and 11 to the primary and secondary circuits, respectively, of the transformer 1 that the operating winding 8 is energized by a current which is proportional to the difference between the primary and secondary current outputs of the transformer 1 and the restraining winding 9 is energized by a current which is proportional to the sum of the primary and secondary currents of the transformer 1. The ratios of transformation of the current transformers 10 and 11 are such that when the transformer 1 is in service and supplying current to its load circuit 3, under normal operating conditions of the transformer 1 the secondary currents of the current transformers are substantially equal so that any small differential current that may flow through the operating winding 8 of the relay 7 is not large enough to effect the closing of its contacts 12, which when closed complete an energizing circuit for the trip coil 6. However, when an internal fault occurs in the transformer 1, an increase in the primary current occurs without a corresponding increase in the secondary or output current of the transformer 1 so that the current output of the current transformer 10 is materially greater than the current output of the current transformer 11. This differential current flows through the operating winding 8 of the protective relay 7 and is large enough to effect the closing of the contacts 12 so as to complete an energizing circuit for the trip coil 6 of the associated circuit interrupter 5.

Similarly, when the primary circuit of the transformer 1 is energized by the closing of the circuit interrupter 5 or by the reenergization of the supply circuit 2 while it is connected to the primary winding 4 of the transformer 1, an increase occurs in the output of the current transformer 10 relative to the current output of the current transformer 11 due to the magnetizing inrush transient current which flows only in the primary winding 4 of the transformer 1.

In order to prevent the differential current which flows in the protective system due to the magnetizing inrush transient current from effecting the operation of the protective relay 7, a desensitizing circuit is established around the operating winding of the protective relay so that when the desensitizing circuit is completed, a portion of the differential current which normally would flow through the operating winding is shunted through the desensitizing circuit. In this manner, a larger differential current than that produced by the magnetizing inrush transient current is required in the protective system in order to effect the operation of the protective relay while the desensitizing circuit is completed.

In the particular arrangement shown in Fig. 1, the desensitizing circuit, which includes an adjustable resistor 13, shunts the operating winding 8 by being completed directly across the secondary circuit of the current transformer 11. It is to be understood, however, that my invention is not limited to having the desensitizing circuit established between any two particular points of the differential protective system.

For controlling the desensitizing circuit through the adjustable resistor 13, I provide a time delay dropout relay 14 having contacts 15 which complete the desensitizing circuit when the relay 14 is energized. The time delay dropout characteristic of the relay 14 is such that when the winding of the relay is deenergized, the relay does not open its contacts 15 until after a predetermined time interval has elapsed which is long enough to allow the magnetizing inrush transient current to subside. The energizing circuit for the relay 14 includes in parallel the auxiliary contacts 16 of the associated circuit interrupter 5, which are closed when the circuit interrupter is open, and the contacts 17 of a voltage relay 18, which are closed while the voltage applied to the operating winding of the relay 18 is below a predetermined value. In accordance with my invention, the operating winding of the relay 18 is connected to the supply circuit 2 by means of a potential transformer 19 so that the relay 18 is responsive to the voltage of the supply circuit 2 and maintains its contacts 17 open as long as the supply circuit voltage is above a predetermined value.

By having the relay 18 similarly control the energization of the dropout relays 14 associated with the differential protective systems of the other power transformers 1 energized from the supply circuit 2, it is apparent that I have provided an improved desensitizing arrangement which requires a single potential transformer connected to the supply circuit 2 for all of the differential protective systems.

The operation of the desensitizing arrangement shown in Fig. 1 is as follows: When a transformer 1 is disconnected from the supply circuit by the opening of its associated circuit interrupter 5, a circuit is completed for the associated dropout relay 14 by the auxiliary contacts 16 of the open interrupter. The contacts 15 of the energized relay 14 maintain the desensitizing circuit of the associated differential protective system completed as long as the circuit interrupter remains open. When the circuit interrupter 5 is closed to place its associated transformer 1 in service and the supply circuit 2 is energized with normal voltage so that the contacts 17 of the voltage relay 18 are open, the opening of the auxiliary contacts 16 of the circuit interrupter deenergizes the time delay dropout relay 14. After a time delay sufficient to allow the magnetizing inrush transient current to subside, the relay 14 opens its contacts 15 and interrupts the associated desensitizing circuit to restore the sensitivity of the relay to its normal value. Similarly, the energizing circuit of the relay 14 is completed by the contacts 17 of voltage relay 18 when the supply circuit 2 is deenergized and is interrupted by the voltage relay 18 opening its contacts 17 in response to the reenergization of the supply circuit 2 if, at the same time the supply circuit is reenergized, the circuit interrupter 5 is in its closed position so that its auxiliary contacts 16 are open.

In the embodiment of my invention shown in Fig. 2, the power transformer 1', which may be one of a plurality of similarly connected transformers, is interconnected between two supply circuits 2' and 2'' by the circuit interrupters 5' and 5''. The power transformer 1' is also provided with the same type of differential protective system as that shown in Fig. 1 including a desensitizing circuit which is arranged to be completed through an adjustable resistor 13' when a time delay dropout relay 14' is in its energized position so that its contacts 15' are closed.

Since the transformer 1' may be excited by connecting it to either supply circuit or by reenergizing either supply circuit when the transformer is interconnected between the two supply circuits, it is necessary to control the energization of the dropout relay 14' so that it is deenergized when the transformer is excited in response to the closing of either circuit interrupter or in response to the reenergization of either supply circuit while the transformer is connected thereto. In accordance with my invention, I accomplish this result by connecting in series the operating winding of the relay 14′, the auxiliary contacts 16′ of the circuit interrupter 5′ which are closed when the circuit interrupter is open, and the auxiliary contacts 16″ of the circuit interrupter 5″ which are closed when the circuit interrupter is open, and by providing means for completing a shunt circuit around the auxiliary contacts 16′ while the voltage of the supply circuit 2′ is below a predetermined value and means for completing a shunt circuit around the auxiliary contacts 16″ while the voltage of the supply circuit 2″ is below a predetermined value. For completing the shunt circuit around the contacts 16′, I provide the contacts 17′ of the voltage relay 18′, which is arranged to be connected across the supply circuit 2′ by the potential transformer 19′ and which is arranged to close its contacts 17′ when the voltage of the supply circuit 2′ is below a predetermined value. The shunt circuit around the contacts 16″ is completed by the contacts 17″ of a similar voltage relay 18″ which is connected to supply circuit 2″ by the potential transformer 19″.

With the connections shown in Fig. 2, the energizing circuit for the relay 14′ is completed through the series connected contacts 16′ and 16″ whenever both of the circuit interrupters 5′ and 5″ are open. Therefore, whenever either circuit interrupter is closed to excite the transformer, the energizing circuit for the relay 14′ is interrupted if the supply circuit to which the transformer is connected by the closed circuit interrupter is energized. For example, if the circuit interrupter 5′ is closed to excite the transformer and the voltage of the supply circuit 2′ is above a predetermined value so that the contacts 17′ of the voltage relay 18′ are open when the circuit interrupter 5′ is closed, the opening of the auxiliary contacts 16′ of the circuit interrupter 5′ interrupts the energizing circuit of the relay 14′ and causes it to open the desensitizing circuit after the circuit interrupter 5′ has been closed for a predetermined time. However, if the supply circuit 2′ is deenergized when the circuit interrupter 5′ is closed, the opening of the auxiliary contacts 16′ of the circuit interrupter 5′ does not effect the deenergization of the relay 14′ and the interruption of the desensitizing circuit because the energizing circuit of the relay 14′ is still completed through the closed contacts 17′ of the deenergized voltage relay 18′.

Since the energizing circuit of the dropout relay 14′ is also completed through the series connected contacts 17′ and 17″ of voltage relays 18′ and 18″, respectively, when both of the circuit interrupters 5′ and 5″ are closed and both of the supply circuits 2′ and 2″ are deenergized, the reenergization of either supply circuit effects the deenergization of the relay 14′ and the subsequent interruption of the desensitizing circuit through the adjustable resistor 13′. For example, if the voltage of the supply circuit 2″ is restored to normal while the supply circuit 2′ is deenergized and both of the circuit interrupters 5′ and 5″ are closed, the opening of the contacts 17″ of the voltage relay 18″ interrupts the energizing circuit of the relay 14′. Therefore, a predetermined time after the transformer 1′ is excited by the voltage being restored to normal across the supply circuit 2″, the desensitizing circuit is interrupted so as to restore the sensitivity of the differential protective system to its normal value.

While I have shown and described my invention in connection with a differential protective system for single phase transformers, it will be obvious to those skilled in the art that it is also applicable to protective systems for polyphase transformers. Therefore, I do not desire to be limited to the exact arrangements shown but seek to cover in the appended claims all those modifications which fall within the true spirit and scope of my invention.

What I claim as new and desire to secure by Letters Patent of the United States is:

1. In a differential protective arrangement for a transformer having a winding connected to a supply circuit by a circuit interrupter, means for desensitizing the protective arrangement for a predetermined time when the winding is excited in response to either the closing of the circuit interrupter or the reenergization of the supply circuit while the circuit interrupter is closed comprising a desensitizing circuit for the differential protective arrangement, a time delayed dropout relay having contacts in said desensitizing circuit which render said desensitizing circuit operative while said relay is in its energized position, a relay responsive to the voltage of said supply circuit and having contacts which are closed when said supply circuit voltage is below a predetermined value, contacts controlled by said circuit interrupter so that they are opened when said circuit interrupter is closed, and an energizing circuit for said dropout relay including said voltage relay contacts and said circuit interrupter controlled contacts so connected therein that said energizing circuit is completed when any of said contacts connected therein are closed.

2. In a differential protective arrangement for a transformer having a winding connected to a supply circuit by a circuit interrupter, means for desensitizing the protective arrangement for a predetermined time when the winding is excited in response to either the closing of the circuit interrupter or the reenergization of the supply circuit while the circuit interrupter is closed comprising a desensitizing circuit for the differential protective arrangement, a time delayed dropout relay having contacts in said desensitizing circuit which render said desensitizing circuit operative while said relay is in its energized position, a relay responsive to the voltage of said supply circuit and having contacts which are closed when said supply circuit voltage is below a predetermined value, auxiliary contacts on said circuit interrupter connected in parallel with said voltage relay contacts and arranged to be open when said circuit interrupter is closed and to be closed when said circuit interrupter is open, and an energizing circuit for said dropout relay including said parallel connected contacts in series therewith.

3. In a differential protective arrangement for a transformer having a winding connected to a supply circuit by a circuit interrupter, means for desensitizing the protective arrangement for a predetermined time when the winding is excited in response to either the closing of the circuit interrupter or the reenergization of the supply circuit while the circuit interrupter is closed comprising a desensitizing circuit for the differential protective arrangement, a time delayed dropout relay having contacts in said desensitizing circuit which render said desensitizing circuit operative while said relay is in its energized position, a voltage relay having contacts which are closed when the voltage applied to said relay is above a predetermined value, a potential transformer for connecting said relay to the supply circuit, auxiliary contacts on said circuit interrupter connected in parallel with said voltage relay contacts and arranged to be open when said circuit interrupter is closed and to be closed when said circuit interrupter is open, and an energizing circuit for said dropout relay including said parallel connected contacts in series therewith.

4. In a differential protective arrangement for a transformer having a plurality of windings respectively connected to different electric circuits by different circuit interrupters, means for desensitizing the protective arrangement for a predetermined time when any circuit interrupter is closed while its associate electric circuit is energized or when any electric circuit is reenergized while its associated circuit interrupter is closed comprising a desensitizing circuit for the differential protective arrangement, a time delayed dropout relay having contacts in said desensitizing circuit which render said desensitizing circuit operative while said relay is in its energized position, voltage relays respectively connected to said electric circuits and respectively having contacts which are closed when the voltages of the respective circuits to which they are connected are below predetermined values, an energizing circuit for said dropout relay including in series said voltage relay contacts, and auxiliary contacts on each circuit interrupter respectively connected in parallel with the contacts of the voltage relay connected to the electric circuit which the respective circuit interrupter connects to the transformer, said auxiliary contacts being open when the respective circuit interrupters are closed and closed when the respective circuit interrupters are open.

5. In combination, a plurality of differential protective arrangements respectively protecting individual power transformers connected to a common supply circuit and respectively being provided with individual desensitizing circuits, a potential transformer energized from the common supply circuit, a voltage relay energized by said potential transformer, and means including said voltage relay for completing the individual desensitizing circuit of each power transformer connected to the common supply circuit when said supply circuit is deenergized and for maintaining each such desensitizing circuit completed for a predetermined time interval after the supply circuit is reenergized.

6. A differential protective arrangement for a power transformer having a plurality of windings respectively connected to different supply circuits by different circuit interrupters, a desensitizing circuit, potential transformers respectively connected to the supply circuits, voltage relays respectively supplied from said potential transformers, and means common to all of said voltage relays and responsive to the operation of any one of said relays when its associated supply circuit becomes deenergized while connected to a winding of the power transformer for completing said desensitizing circuit and responsive to the operation of any one of said relays when its associated supply circuit is reenergized while connected to a winding of the power transformer for maintaining said desensitizing circuit completed for a predetermined time interval after such reenergization.

AMOS W. BATEMAN.

REFERENCES CITED

The following references are of record in the file of this patent:

UNITED STATES PATENTS

| Number | Name | Date |
| --- | --- | --- |
| 1,959,053 | Goldsborough | May 15, 1934 |